United States Patent [19]

Sagishima et al.

[11] 4,337,477
[45] Jun. 29, 1982

[54] COLOR DEMODULATING APPARATUS

[75] Inventors: Takayuki Sagishima, Suita; Teruo Kitani, Takatsuki, both of Japan

[73] Assignee: Matsushita Electric Industrial Co., Ltd., Osaka, Japan

[21] Appl. No.: 139,222

[22] Filed: Apr. 11, 1980

[30] Foreign Application Priority Data

Apr. 19, 1979 [JP] Japan .................................. 54-48794
Aug. 10, 1979 [JP] Japan ................................ 54-102422
Nov. 21, 1979 [JP] Japan ................................ 54-151226

[51] Int. Cl.³ ............................................. H04N 9/50
[52] U.S. Cl. ...................................... 358/18; 358/24
[58] Field of Search ................................ 358/24, 18

[56] References Cited

FOREIGN PATENT DOCUMENTS

1395491 5/1975 United Kingdom .................. 358/24

Primary Examiner—John C. Martin
Attorney, Agent, or Firm—Wenderoth, Lind & Ponack

[57] ABSTRACT

A color signal demodulating device designed so that a local subcarrier oscillator generates a demodulating signal which is both synchronized and inverted in phase with respect to a color signal at each horizontal scanning period so as to demodulate an R-Y signal and which reverses phase with each horizontal scanning period; a bust signal and a signal inverted in phase therefrom are alternately switched therebetween and used to drive the local subcarrier oscillator. The output of this local subcarrier oscillator can be used for both the demodulation signal for the R-Y carrier and as the demodulation signal for the B-Y demodulator.

3 Claims, 10 Drawing Figures

| SIGNAL \ STATE LINE | (a) n, n-1, n-2, n-3 | (b) n, n-1, n-2, n-3 |
|---|---|---|
| TRANSMISSION BURST PULSE | ↙ ↘ ↙ ↘ | ↙ ↘ ↙ ↘ |
| OUTPUT OF ÷ 2 FREQ. DIVIDER (9) | ⊓_⊓_ | _⊓_⊓ |
| OUTPUT OF FIRST SWITCH (8) | ↘ ↗ ↖ ↘ | ↘ ↙ ↘ ↙ |
| OUTPUT OF OSCILLATOR (11) | ↑ ↑ ↑ ↑ | ↓ ↓ ↓ ↓ |
| OUTPUT OF SECOND SWITCH (14) | ↑ ↓ ↑ ↓ | ↑ ↓ ↑ ↓ |
| OUTPUT OF −90° PHASE SHIFTER | → → → → | ← ← ← ← |
| OUTPUT OF PHASE DISCRIMINATOR (23) | ⊔⊔⊔⊔ | ⊓⊓⊓⊓ |
| OUTPUT OF THIRD SWITCH (15) | → → → → | → → → → |

| SIGNAL \ STATE LINE | (a) n, n+1, n+2, n+3 | (b) n, n+1, n+2, n+3 |
|---|---|---|
| TRANSMISSION BURST PHASE | | |
| OUTPUT OF ÷2 FREQ. DIVIDER (9) | | |
| OUTPUT PHASE OF FIRST SWITCH (8) | | |
| OUTPUT PHASE OF LOCAL SUBCARRIER OSC. (11) | | |
| OUTPUT PHASE OF DIFFERENCE CALCULATING CIR. (2) | | |
| OUTPUT PHASE OF FOURTH SWITCH (25) | | |
| OUTPUT PHASE OF −90° PHASE SHIFTER (12) | | |
| OUTPUT PHASE OF PHASE DISCRIMINATOR (23) | | |
| OUTPUT PHASE OF FIFTH SWITCH (27) | | |

| SIGNAL \ STATE LINE | a | | | | b | | | |
|---|---|---|---|---|---|---|---|---|
| | n | n-1 | n-2 | n-3 | n | n-1 | n-2 | n-3 |
| TRANSMISSION BURST PHASE OUTPUT OF ÷2 FREQ. DIVIDER (9) | ↘ | ↗ | ↖ | ↙ | ↘ | ↗ | ↖ | ↙ |
| OUTPUT PHASE OF THIRD SWITCH (8) | ↘ | ↗ | ↖ | ↙ | ↘ | ↙ | ↘ | ↙ |
| OUTPUT PHASE OF LOCAL SUBCARRIER OSC. (11) | ↑ | ↑ | ↑ | ↑ | ↓ | ↓ | ↓ | ↓ |
| OUTPUT PHASE OF DIFF. CALCULATING CIR. (2) | ↑ | ↓ | ↑ | ↓ | ↑ | ↓ | ↑ | ↓ |
| OUTPUT PHASE OF FOURTH SWITCH (25) | ↑ | ↑ | ↑ | ↑ | ↓ | ↓ | ↓ | ↓ |
| OUTPUT PHASE OF -90° PHASE SHIFTER (12) | → | → | → | → | ← | ← | ← | ← |
| OUTPUT PHASE OF SIXTH SWITCH (29) | ↘ | ↙ | ↖ | ↙ | ↘ | ↗ | ↘ | ↗ |
| OUTPUT PHASE OF DIFF CALCULATING CIR. (3) | → | → | → | → | → | → | → | → |
| OUTPUT PHASE OF FIFTH SWITCH (27) | → | → | → | → | ← | ← | ← | ← |

FIG.10 ical application.
COLOR DEMODULATING APPARATUS

BACKGROUND OF THE INVENTION

This invention relates to a color demodulating apparatus for PAL type color television receivers.

As is generally known, in the PAL system, the modulating axis for one of the two color signals, for the example the R-Y signal, is sent with the phase reversed 180° for each horizontal scanning period (referred to below as 1 H). One method which has been considered for the demodulation of such color signals at the correct polarity has been to control the local subcarrier oscillator using the output passing through a switch which changes the phase information of the scanning line with each 1 H. In past designs, however, the local subcarrier oscillator has been for demodulation of the R-Y signal and it has been necessary to provide another local subcarrier oscillator to demodulate the B-Y signal. This invention eliminates this shortcoming by offering a circuit which not only allows acquisition of the correct polarity R-Y signal but also the correct polarity B-Y signal via a single local subcarrier oscillator.

SUMMARY OF THE INVENTION

This invention offers the following features: it is designed to alternatively switch between a burst signal and a signal with its phase inverted from that of the burst signal out of PAL type color television signals at each horizontal scanning period so as to drive the local subcarrier oscillator using those alternatively switched signals. The apparatus may be equipped with a first signal path or route which supplies the output of the local subcarrier oscillator to one of the color signal demodulators used to demodulate one of the color signals extracted from the television signals and inverting in polarity with each horizontal period. Alternatively, the apparatus may be equipped with a first switching circuit which alternatively switches between the input signal and a signal which has been inverted in phase therefrom at each horizontal period in accordance with the above-noted switching and supplies the output of the first switching circuit to one of the color signal input routes of the color signal demodulator. The apparatus may also be equipped with a second route which adds a signal, having a 90° phase difference from the demodulation signal created from the output of the local subcarrier oscillator and supplied to the demodulator, to the other color signal demodulator used to demodulate the other constant-phase color signal extracted from the television signals. Alternatively, the apparatus may also be equipped with a second switching circuit which selectively extracts the input signal and a signal which has been inverted in phase therefrom for one of the color signal input routes of the other color signal demodulator. The apparatus also features a control circuit which controls the second switching circuit by a signal which detects the phase relationship between the burst signal and the signal obtained from the second route and which controls the polarity of the demodulation signal supplied to the other color signal demodulator so that it matches the polarity of the color signal supplied to the other color signal demodulator. Examples of the application of this invention are explained below in reference to the drawing figures.

DESCRIPTION OF THE PREFERRED EMBODIMENTS

Figure 1:
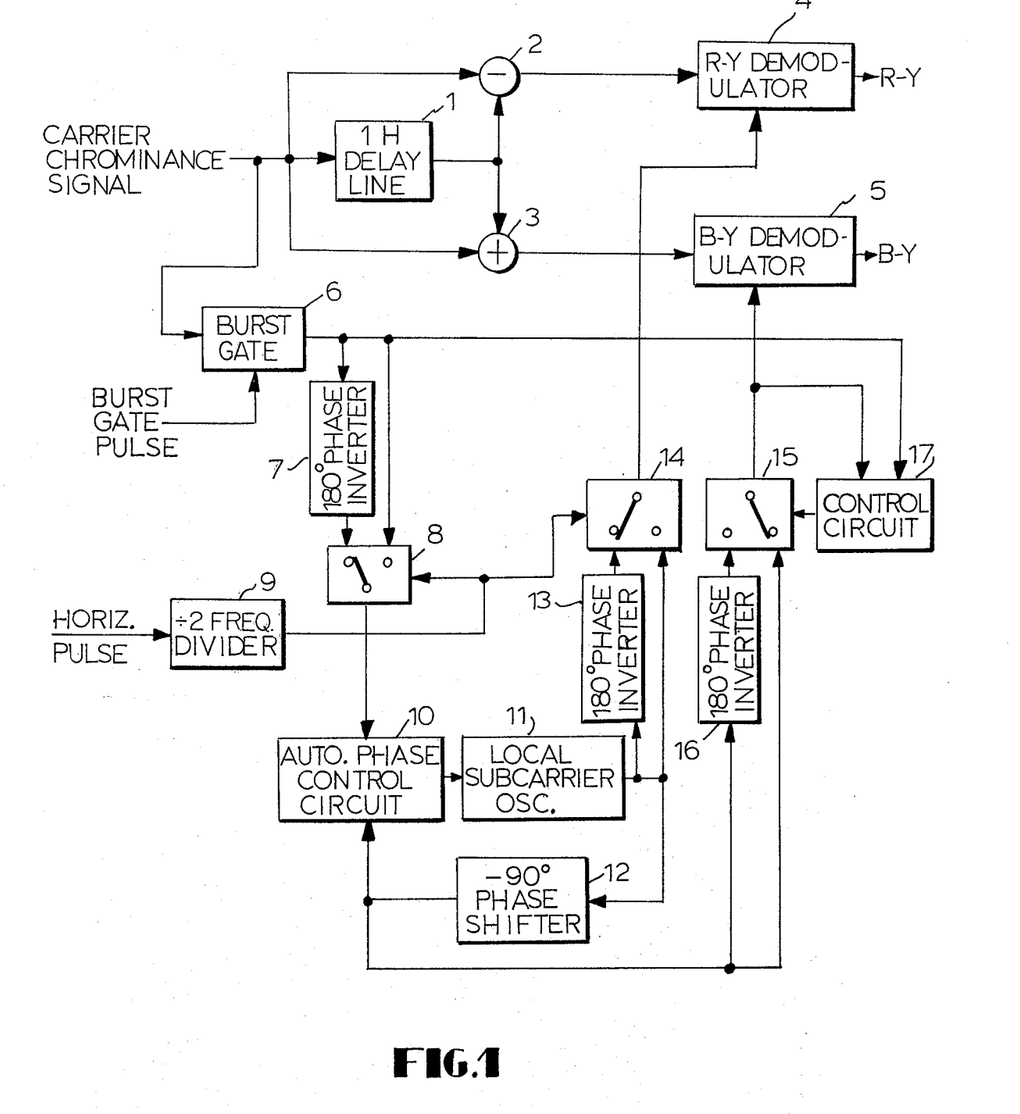
FIG. 1 is a block diagram of the color demodulating apparatus as used in a typical application.
Figure 2:
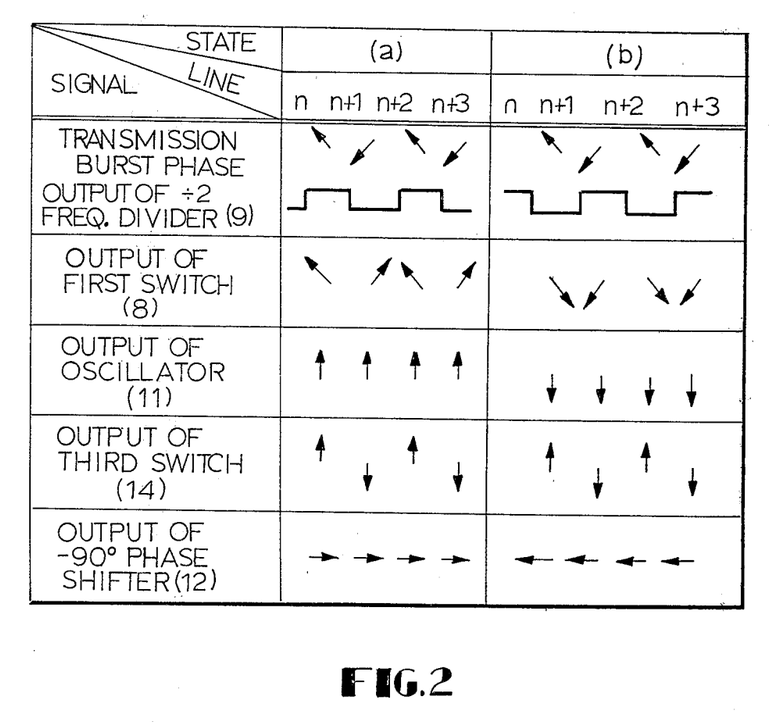
FIG. 2 is a vector diagram and wave diagram explaining the apparatus.

As shown in FIG. 1, burst gate 6 extracts just the burst signal from the carrier chrominance signal and adds it directly to one input terminal of the first switching circuit 8 and at the same time supplies the burst signal to the other input terminal of switching circuit 8 through a 180° phase inverter 7. At the first switching circuit 8, a switching signal with a frequency half that of the horizontal frequency (below referred to as $f_H$) is supplied from a frequency divider 9, which divides the horizontal frequency in two. The output of the switching circuit 8 is added to an automatic phase control circuit 10. For example, when the $f_H/2$ switching signal is at the positive 1 H period, the burst signal from the burst gate 6 is directly added to the phase control circuit 10 and when the $f_H/2$ switching signal is at the negative 1 H period, the burst signal which has passed through the 180° phase inverter 7 is added to the phase control circuit 10. In FIG. 2, state (a) is that state when the phase of the PAL system alternating burst signal is equal to +135° when the phase of the output of the frequency divider 9 is at the positive 1 H period and is equal to −135° when the phase of the output is at the negative 1 H period. State (b) is that state when the phase of the burst signal is conversely equal to −135° at the positive 1 H period and +135° at the negative 1 H period. In state (a), the burst phase of the output of the first switch 8 is a repeated 135° and 45° by line. On the other hand, in state (b), the phase becomes a repeated −45° and −135°. This burst signal from the first switch 8 is added to a phase-locked loop (PLL) circuit, composed of the automatic phase control circuit 10, a local subcarrier oscillator 11, and a −90° phase shifter 12. The phase of the oscillating output of the local subcarrier oscillator 11 matches the average phase of the input burst signal and has an oscillating phase of +90° for state (a) and −90° for state (b). This is to say, the phase of local subcarrier oscillator 11 is controlled by the phase of the $f_H/2$ switching signal so that it is either +90° or −90°. At the third switching circuit 14, the $f_H/2$ switching signal from the previously mentioned frequency divider 9 is used and a R-Y demodulator 4 is supplied with, for example, the reference subcarrier output from the local subcarrier oscillator 11 when the $f_H/2$ switching signal is at the positive 1 H period or alternatively supplied with a standard subcarrier output passed through a phase inverter 13 when the signal is at the negative 1 H period. As shown in FIG. 2, the phase of the output of the third switching circuit 14 is always +90° when the alternating burst signal phase is +135° and is always −90° when the phase is −135°, regardless of the phase of the $f_H/2$ switching signal. Therefore, a R-Y color difference signal with the correct polarity can be obtained from the output of the R-Y demodulator 4, which demodulates the R-Y carrier chrominance signal phassed through a delay line matrix circuit composed of the 1 H delay line 1 and difference subtracting circuit 2, by using the subcarrier from the third switching circuit 14. However, if one tries to use the output of the local subcarrier oscillator 11 to demodulate the B-Y carrier chrominance signal processed by the 1 H delay line and the adding circuit 3, the problem arises, for example, when the output of the −90° phase shifter 12 becoming 180° out of phase due to the phase of the switching signal, as shown in FIG. 2. For this reason, past designs have included a separate local subcarrier oscillator for the B-Y demodulator which would not affect the phase of the $f_H/2$ switching signal. This invention eliminates the need for the attachment of two strict performance oscillators and allows demodulation of the B-Y signal by the output of the above local subcarrier oscillator 11. The reference subcarrier output from the −90° phase shifter 12 is added to one terminal of the second switching circuit 15 directly and to the other terminal of the switching circuit 15 through a 180° phase inverter 16. Control circuit 17 compares the burst signal of burst gate 6 and the output of the second switching circuit 15 so as to control the phase of the reference subcarrier output of the second switching circuit 15 to be 0°, or 180° different from the average phase of the transmission burst signal.

Figure 3:
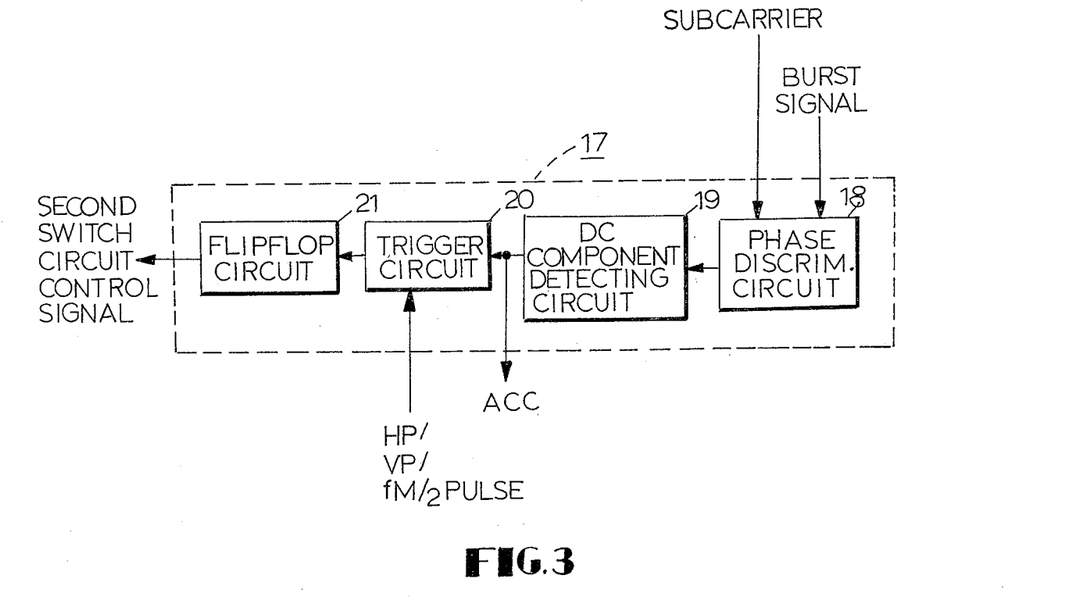
FIG. 3 and FIG. 4 are block diagrams of portions of the apparatus.

Next, a more detailed explanation is given of the control circuit 17. FIG. 3 is a block diagram of an example of an application of the control circuit 17. Phase discriminating circuit 18 performs homodyne detection of the burst signal having a phase of +135° and −135° for alternately for each 1 H using the reference subcarrier from the second switching circuit. The phase of this reference subcarrier, as mentioned above, is either 0° or 180° depending on the phase of the $f_H/2$ switching signal. If the phase is 0°, the burst detecting output of the phase discriminating circuit 18 takes on a negative polarity. The d.c. component detecting circuit 19 is composed of a low pass filter or a peak hold circuit and detects the d.c. component of the burst detecting output. This d.c. output is applied to the trigger circuit 20. The trigger circuit 20 applies a trigger signal to the flipflop circuit 21 so as to change its state in dependence upon the output of the d.c. component detecting circuit 19. Assuming as we are now that the phase of the reference subcarrier from the second switching circuit is 0°, then there will be no change in the state of flipflop circuit 21 when the output of the d.c. component detecting circuit 19 is negative.

Now, suppose that the phase reference subcarrier fed to the phase discriminating circuit is 180°. The burst detecting output of the phase discriminating circuit 18 becomes positive and the d.c. component detecting circuit 19 output gives out a signal indicating a positive d.c. component. During this time, the trigger circuit 20 generates a trigger signal to change the state of the flipflop circuit 21. The second switching circuit 15, which is controlled by the output of the flipflop circuit 21, then changes in state and the phase of the reference subcarrier is changed from 180° to the desired 0°. When the phase has changed to 0°, no more trigger signals are generated from the trigger circuit 20, as mentioned above, and the flipflop circuit 21 remains as it is, that is—the second switch 15 remains in the same position and a continual 0° reference subcarrier can be obtained from its output. The trigger circuit 20 can be realized with a gate circuit, i.e. an AND circuit, which allows passage of the horizontal pulse, vertical pulse, or the previously $f_H/2$ switching signal only when the respective d.c. component detecting circuit 19 output shows a positive d.c. component. Furthermore, since the output of the d.c. component detecting circuit 19 corresponds to the burst level, it is possible to use it as the automatic color gain control (ACC) signal of the carrier chrominance signal amplifier (not shown in drawing figures). A killer function operates at the same time as when the burst signal level drops due to the killer operation of the color demodulating circuit being set off when above a certain negative level of the d.c. component detecting circuit 19 and also when the state of the second switch 15 is inappropriate and the polarity of the B-Y color difference output is incorrect. The advantage is that the reproduction of an inappropriate color on the screen cannot be detected for receivers using this circuit.

Figure 4:
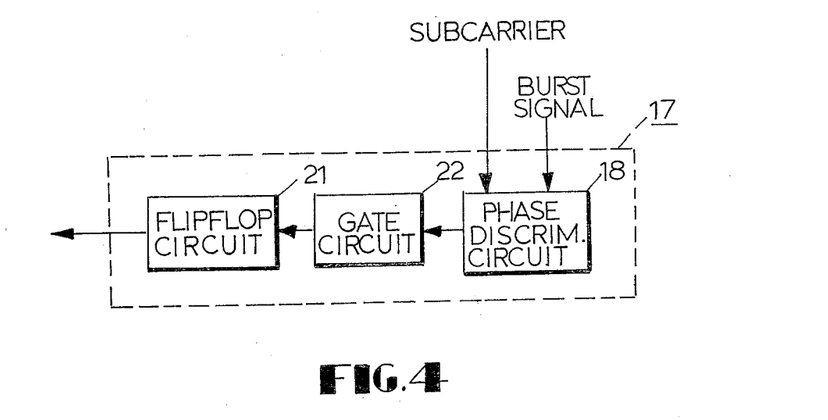

FIG. 4 shows another example of an application of control circuit 17. The phase discriminating circuit 18 functions in the same way as the one mentioned in FIG. 3. Gate circuit 22 is such that the burst detecting output of the phase discriminating circuit 18 is only applied to the flipflop circuit 21 as a trigger signal when positive. It is not transmitted to the flipflop circuit 21 when negative. The above mentioned control circuit 17 functions under this setup.

In the examples of application mentioned above, there is no need to use two oscillators, as was needed in previous designs; there are less externally attached parts, particularly in integrated circuits; and the R-Y demodulator and B-Y demodulator may be constructed in a symmetrical form. Because of these advantages, the use of integrated circuits is facilitated.

Figure 5:
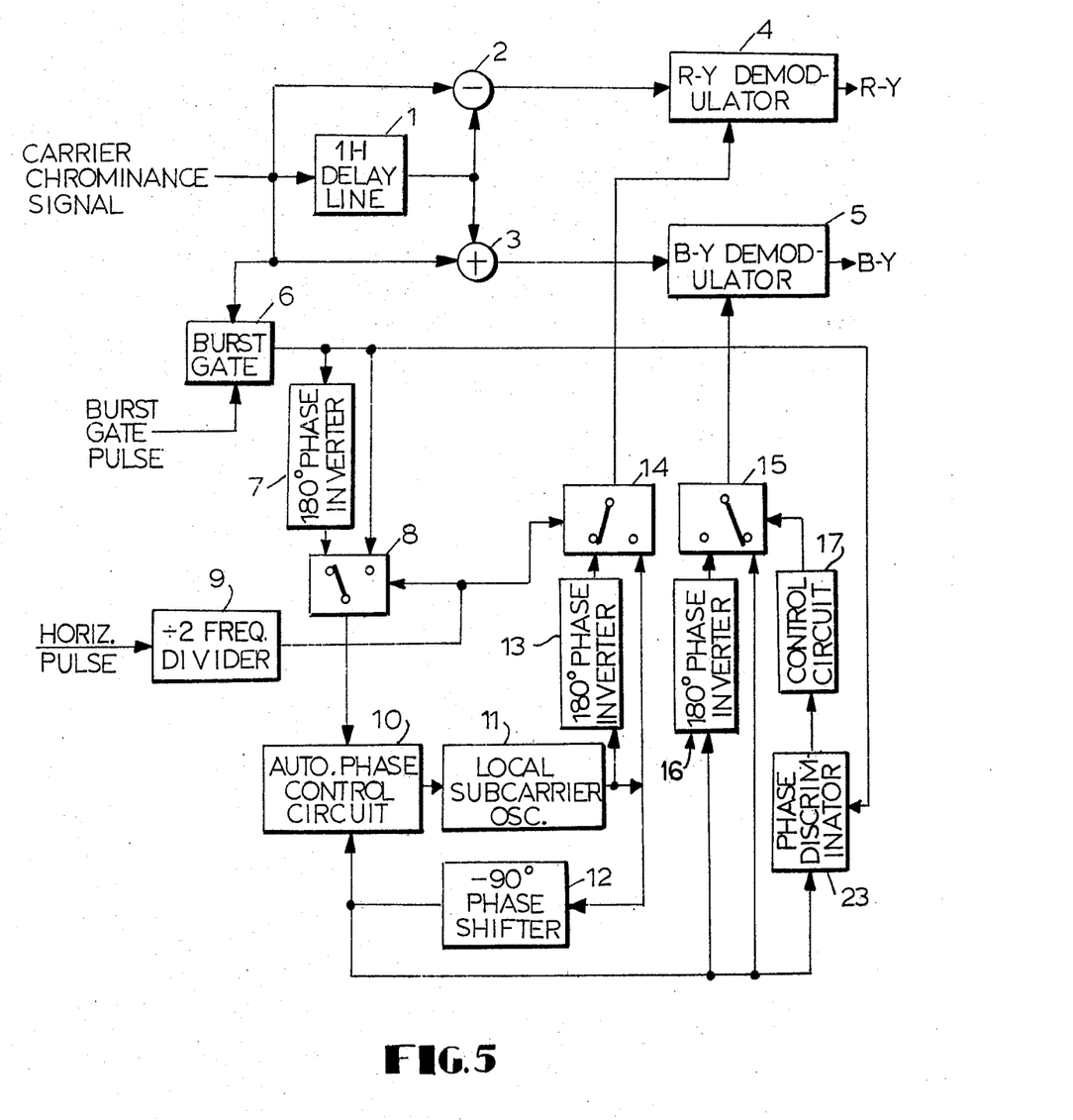
FIG. 5 is a block diagram of the color demodulating apparatus as used in another application example.
Figure 6:
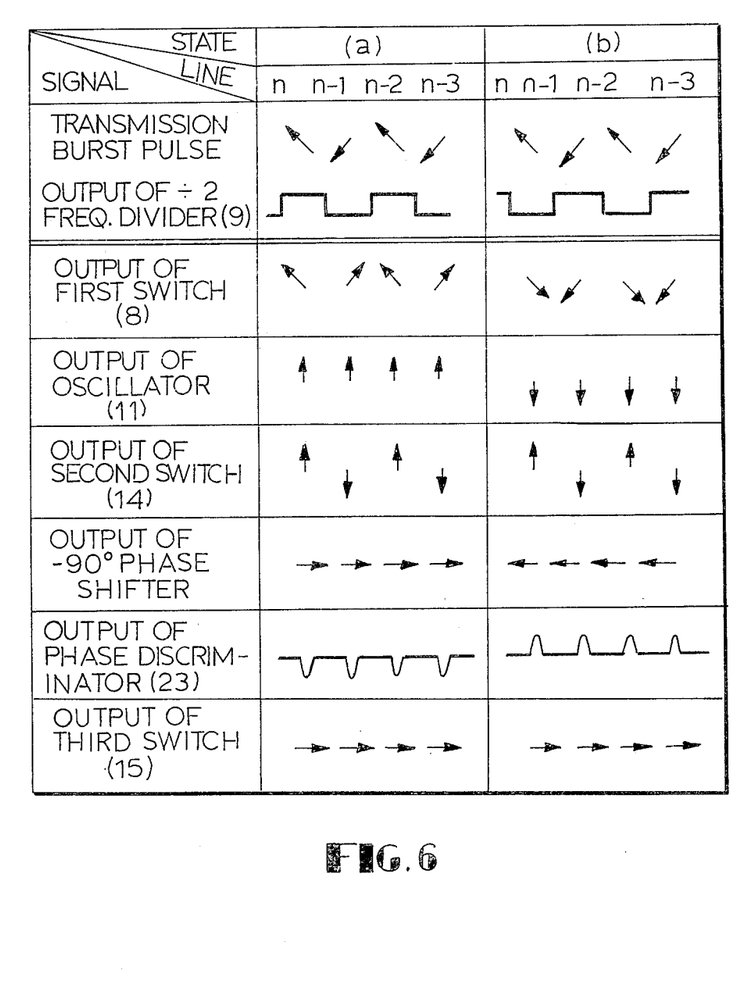
FIG. 6 is a vector diagram and wave diagram explaining the apparatus.

FIG. 5 shows another example of an application of this invention. Elements which are the same as those shown in FIG. 1 bear the same designation numbers and their explanations are omitted. This example may be characterized as follows: The burst signal extracted at burst gate 6 is phase discriminated by a phase discriminator 23 on the basis of the standard output of local subcarrier oscillator 11, which has been phase shifted by the −90° phase shifter 12, and the control circuit 17 is controlled with this discriminated output. FIG. 6 is a vector and wave diagram in the same format as FIG. 3. The output of the phase discriminator 23 is negative when the state is (a) and positive when the state is (b). By this difference, control circuit 17 controls the connection of the third switching circuit 15 so as to produce an output corresponding to the input from the −90° phase shifter 12 in the case of state (a) and to produce an output corresponding to the input from the phase inverter 16 in the case of state (b). In this way, the desired reference subcarrier output is obtained.

Figure 7:
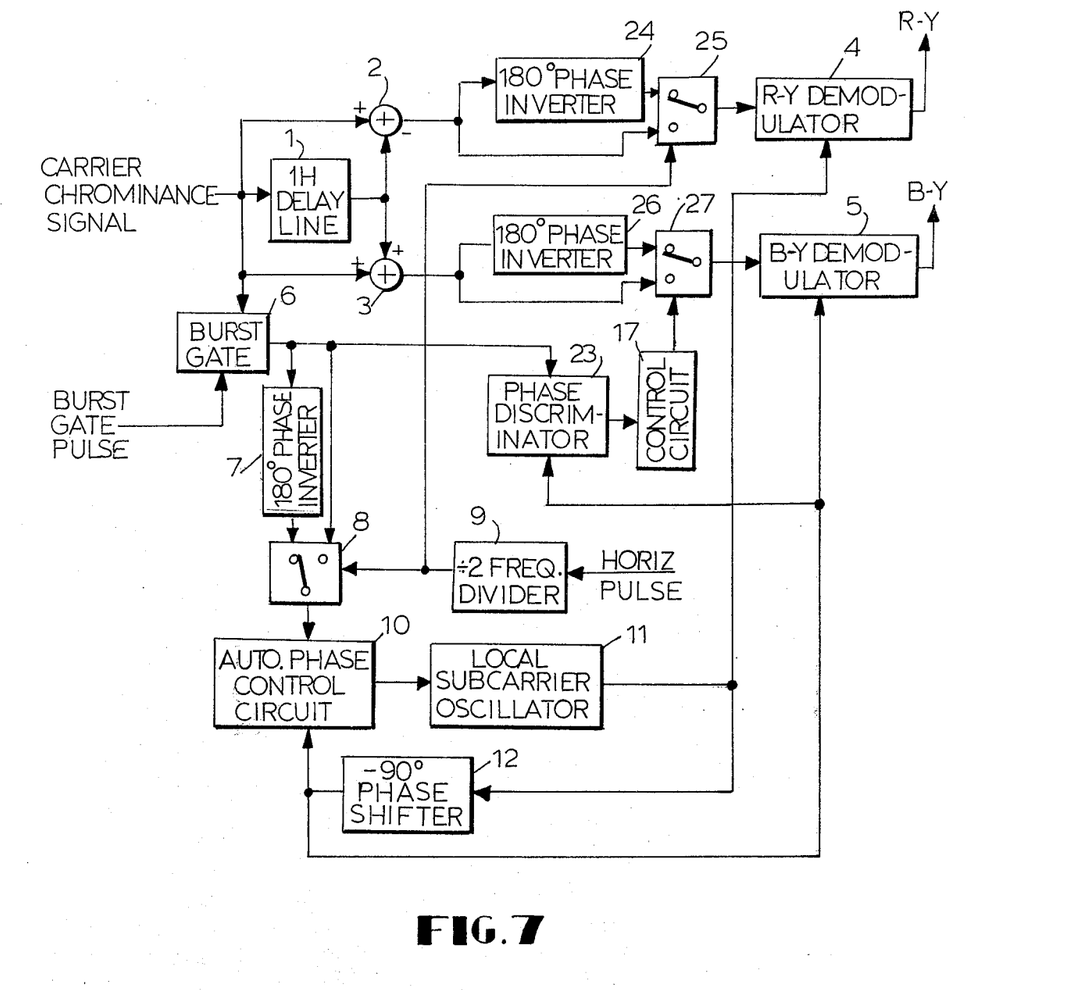
FIG. 7 is a block diagram of the color demodulating apparatus as in a third application example and FIG. 8 the vector diagram and wave diagram explaining the apparatus.
Figure 8:
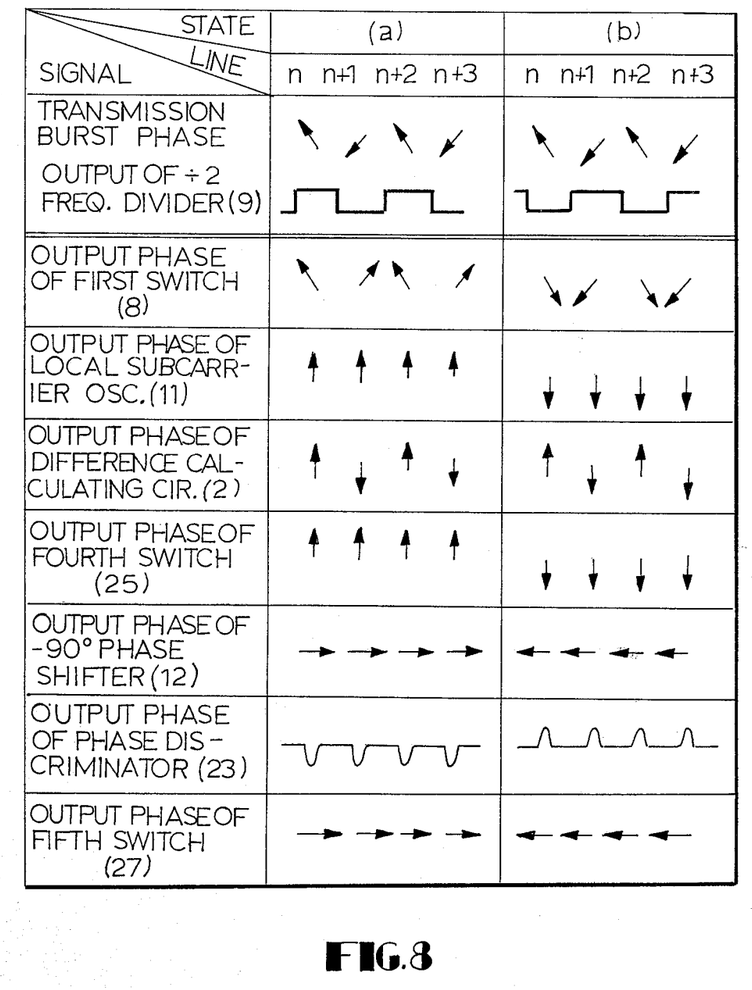

FIG. 7 is another application example. Elements which are the same as those shown in FIG. 4 bear the same designation numbers and their explanations are omitted. This example may be characterized as follows: The output of the local subcarrier oscillator 11 is applied to the R-Y demodulator unchanged. Instead, a phase inverter 24 and a fourth switching circuit 25 are provided between the subtracting circuit 2 and the R-Y demodulator 4, and that switching circuit 25 is switched and controlled by the output of frequency divider 9. The output of the −90° phase shifter 12 is also applied unchanged to the B-Y demodulator. A 180° phase inverter 26 and a fifth switching circuit 27 are provided between the adding circuit 3 and the B-Y demodulator 5 and that switching circuit 27 is switched and controlled by the output of the control circuit 17. In this application, the apparatus combines the switching circuits 14 and 15 of the apparatus of FIG. 4 into the color signal channel and is properly controlled as with FIG. 4. FIG. 8 is a vector diagram and wave diaphragm explaining the operations of the apparatus of FIG. 7.

Figure 9:
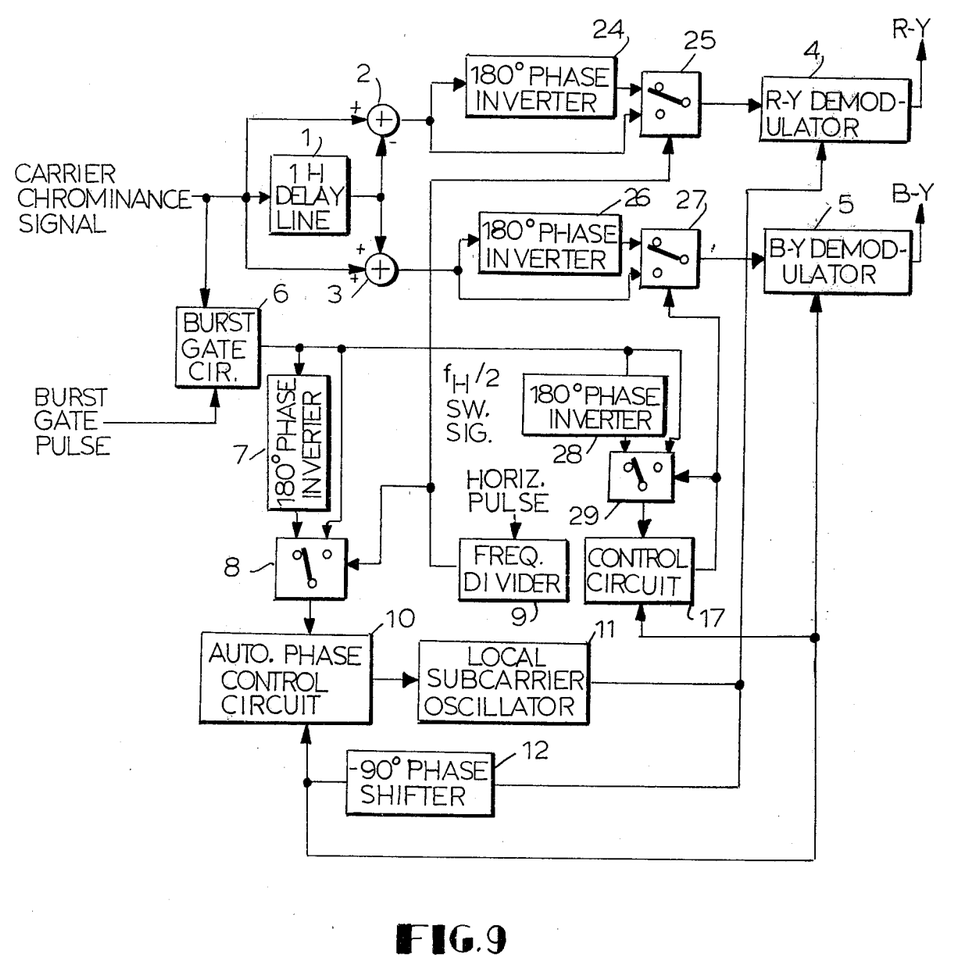
FIG. 9 is a block diagram of the color demodulating apparatus as used in a fourth application example and FIG. 10 the vector diagram and wave diagram explaining the apparatus.
Figure 10:
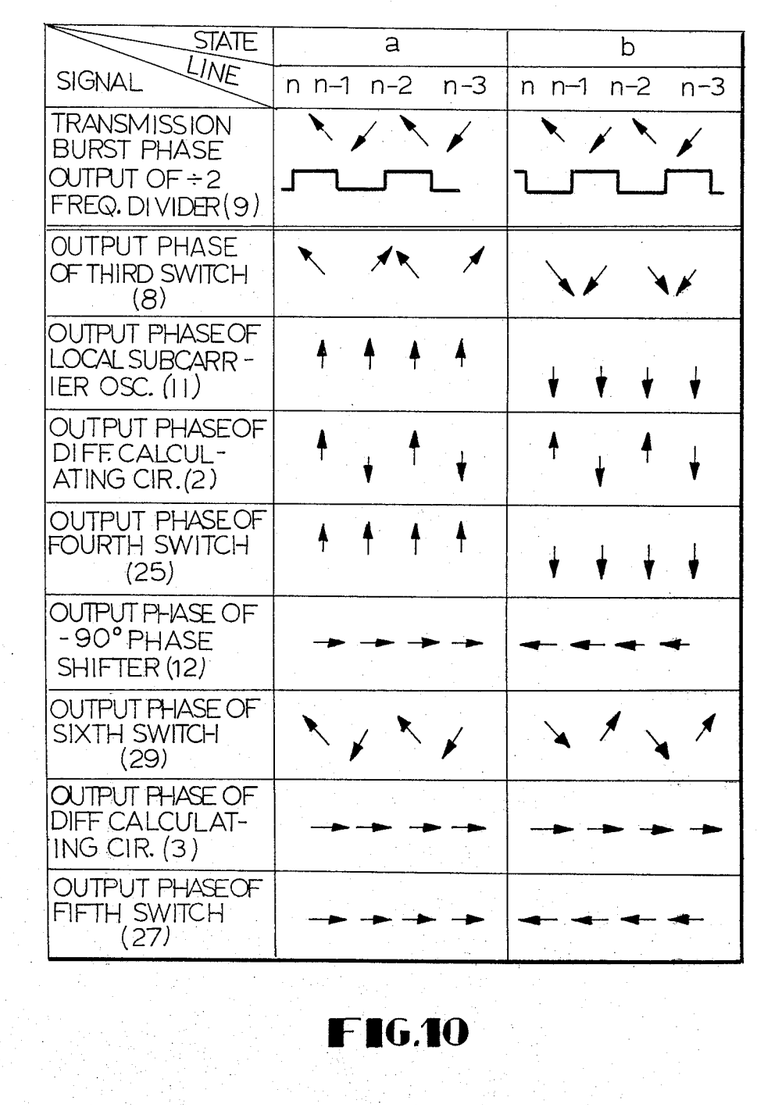

FIG. 9 shows still another example of an application of this invention. Elements which are the same as those shown in FIG. 7 bear the same designation numbers and their explanations are omitted. This application may be characterized as follows: a 180° phase inverter 28 and sixth switching circuit 29 are provided between the burst gate 6 and control circuit 17. The output of the control circuit 17 is used to control switching circuit 27 and to control switching circuit 29. FIG. 10 is a vector diagram and wave diagram explaining the operations of the apparatus of FIG. 9. A brief explanation of the operation follows: The burst signal from burst gate 6 is applied to one of the input terminals of switching circuit 29 directly and is supplied to the other input terminal of the switching circuit 29 through the phase inverter 28. Control circuit 17 compares the output phase of the −90° phase shifter 12 and the output phase of the switching circuit 29 and controls the switching circuit 29 so that the detection output is always negative.

In other words, control is exercised so that switching circuit 29 directly outputs the burst signal in the case of state (a) FIG. 10 and outputs the burst signal through the phase inverter in the case of state (b) FIG. 10. This control circuit 17 also controls the other color signal, B-Y demodulator 5, whose modulating axis is always constant, in the same way as it does switching circuit 29. Therefore, the output of B-Y demodulator 5, which demodulates the B-Y carrier chrominance signal from the switching circuit based on the reference subcarrier of the −90° phase shifter 12 can be used to obtain the B-Y color difference signal of correct polarity under both states (a) and (b).

What is claimed is:

1. A color demodulating apparatus for alternatively switching between a burst signal and a signal with its phase inverted from said burst signal out of PAL type color television signals at each horizontal scanning period and for driving a local subcarrier oscillator using those alternatively switched signals; said apparatus comprising:
   a first switching means and a first phase inverter operatively connected to an output of said local subcarrier oscillator, said first switching means connected to one input of one of a pair of color signal demodulators used to demodulate one of the color signals extracted from said television signals, wherein said first switching means alternatively feeds said output of said local subcarrier oscillator and a phase inverted version thereof from said first phase inverter to said one input of said one of said pair of color signal demodulators;
   a 90° phase shifter operatively connected to output of said local subcarrier oscillator to produce a 90° phase shifted local subcarrier oscillator output signal;
   a second switching means and a second phase inverter operatively connected to said 90° phase shifter and to one input of the other of said pair of color signal demodulators, said switching means alternatively feeding an output of said second phase inverter and said 90° phase shifted local subcarrier oscillator output to said one input of said other of said pair of color signal demodulators; and
   a control circuit operatively connected to said second switching means to control said second switching means such that the polarity of the signal applied to said one input of the other demodulator by said second switching means matches the polarity of the other color signal extracted from the television signals applied to the other input of said other demodulator.

2. A color demodulating apparatus for alternatively switching between a burst signal and a signal with its phase inverted from said burst signal out of PAL type color television signals at each horizontal scanning period and for driving a local subcarrier oscillator using those alternatively switched signals; said apparatus comprising:
   a first path for feeding an output of said local subcarrier oscillator to one input of one of a pair of color signal demodulators used to demodulate one of the color signals extracted from said television signals;
   a 90° phase shifter operatively connected to said output of said local subcarrier oscillator to produce a 90° phase shifted local subcarrier oscillator output signal;
   a second path for feeding said 90° phase shifted local subcarrier oscillator output signal from said 90° phase shifter to one input of the other of said pair of color signal demodulators;
   a first switching means and a first phase inverter operatively connected to another input of said one of said pair of color signal demodulators, wherein said first switching means alternatively feeds a signal derived from said PAL type color television signals and a phase inverted version thereof;
   a second switching means and a second phase inverter operatively connected to another input of said other of said pair of color signal demodulators, wherein said second switching means alternatively feeds another signal derived from said PAL type color television signals and a phase inverted version thereof to said other of said pair of color signal demodulators;
   a control circuit operatively connected to said second switching means to control said second switching means in dependence upon the phase relationship between said signal supplied by said second path to said other of said pair of color signal demodulators and said burst signal.

3. A color demodulating apparatus for alternatively switching between a burst signal and a signal with its phase inverted from said burst signal out of PAL type color television signals at each horizontal scanning period and for driving a local subcarrier oscillator using those alternatively switched signals; said apparatus comprising:
   a first path which feeds an output of said local subcarrier oscillator to one of a pair of color signal demodulators used to demodulate one color signal extracted from said television signals and inverting in polarity with each horizontal period, or which comprises a first switching circuit which alternatively switches between an input signal and a signal which has been inverted in phase therefrom at each horizontal period and supplies said alternatively switched signal to one color signal input route of said pair of color signal demodulators;

a 90° phase shifter, operatively connected to said output of said local subcarrier oscillator, for producing a 90° phase shifted subcarrier oscillator output signal;

a second switching circuit which selectively extracts the color signal and a color signal which has been inverted in phase therefrom for one color signal input path of the other of said pair of color signal demodulators; and a control circuit which controls said second switching circuit by detecting the phase relationship between said burst signal and said 90° phase shifted local subcarrier oscillator output signal and for controlling the polarity of the color signal supplied to the other of said pair of color signal demodulators such that it has the same polarity as said 90° phase shifted local subcarrier oscillator output signal applied to the other input path of said other demodulator.

* * * * *